United States Patent [19]

Kostikov et al.

[11] 4,221,831

[45] Sep. 9, 1980

[54] METHOD OF MAKING ANTIFRICTION PRODUCTS

[76] Inventors: Valery I. Kostikov, ulitsa Vavilova, 93, kv. 91; Alexandr S. Tarabanov, ulitsa Sayanskaya, 6, kv. 123, both of Moscow; Vitaly A. Ivanov, ulitsa Sovetskaya, 6, kv. 91, Zheleznodorozhny Moskovskoi; Anatoly M. Zykov, ulitsa Metallurgov, 13, kv. 14, Chelyabinsk, all of U.S.S.R.

[21] Appl. No.: 929,439

[22] Filed: Jul. 31, 1978

[51] Int. Cl.$^2$ ............................................. B05D 3/02
[52] U.S. Cl. .................................. 427/314; 427/397.7; 427/379; 427/398.1; 427/374.4
[58] Field of Search ............ 427/228, 294, 314, 372 A, 427/376 A, 376 R, 399, 398 R, 249, 379, 113, 374 R, 374 C, DIG. 11; 428/408

[56] References Cited

U.S. PATENT DOCUMENTS

| | | | |
|---|---|---|---|
| 2,784,112 | 3/1957 | Nicholson | 264/56 |
| 2,996,783 | 8/1961 | Mayer | 427/374 R |
| 3,079,273 | 2/1963 | Johnson | 427/228 |
| 3,095,316 | 6/1963 | Hartwig | 428/408 |
| 3,140,193 | 7/1964 | Kane | 427/376 A |
| 3,164,489 | 1/1965 | Timper | 427/113 |
| 3,275,471 | 9/1966 | Lowell et al. | 427/376.2 |
| 3,385,723 | 5/1968 | Pickar | 427/228 |
| 3,634,116 | 1/1972 | Woemer et al. | 427/249 |
| 3,925,577 | 12/1975 | Fatzer et al. | 427/249 |

FOREIGN PATENT DOCUMENTS 1202689  8/1970  United Kingdom ..................... 427/249
1394106  5/1975  United Kingdom .

*Primary Examiner*—Shrive P. Beck
*Assistant Examiner*—S. L. Childs
*Attorney, Agent, or Firm*—Fleit & Jacobson

[57] ABSTRACT

In accordance with the proposed method of making antifriction products, a porous carbon blank is heated up to 1,800° to 2,200° C. and impregnated with molten silicon. The impregnation starts at a temperature of 2,100° to 2,200° C. for 3 to 5 minutes, then at 1,800° to 2,050° C. for 30 to 40 minutes. Thereafter, the blank is cooled down to a temperature of 900° to 800° C. at a rate of 30° to 40° C./min, then down to 200° to 150° C. at a rate of 50° to 100° C./min. This permits obtaining products with an even phase distribution, whereby their wear resistance and strength are improved.

3 Claims, No Drawings

METHOD OF MAKING ANTIFRICTION PRODUCTS

FIELD OF THE INVENTION

The present invention relates to methods of manufacturing and treatment of friction couple elements, and more particularly to methods of making antifriction products from carbon materials for use as sealing rings, thrust bearings and journals, sliding bearings in borehole electric pumps and chemical apparatus such as centrifuges and pumps exposed to such aggressive media as acids, kerosene, petroleum, oils, alkali and salt solutions, as well as fluids operating at elevated temperatures in contact with aggressive media.

BACKGROUND OF THE INVENTION

Known in the art is a method of making antifriction products, whereby a carbon (graphite) blank is treated with silicon oxide vapors at a temperature of 1,600° to 2,200° C. The vapors are evolved from silicon oxide atomized in a hydrogen current. The reducing atmosphere and high temperature promote vaporization and interaction of the vapors with graphite. As a result, silicon carbide is formed, which precipitates on the graphite surface and produces a surface layer.

Thus, a material containing silicon carbide and graphite is obtained. However, such a material suffers from a number of serious disadvantages stemming, primarily, from the fact that silicon carbide and graphite exhibit different coefficients of thermal expansion, resulting in cracks either in graphite or in silicon carbide when temperatures vary. Therefore, when products made by this method operate in contact with corrosive and hydroabrasive media, they eventually disintegrate because of the penetration of these media into cracks.

Also known is a method of making antifriction products (cf. British Pat. No. 1,394,106; Cl. ClA), according to which a carbon filler and a binder are mixed, and the resulting mixture is compressed at 150° to 180° C. to produce a blank having a density of 1.4 g/cu.cm. The blank is heated to a temperature of 800° to 1,000° C., then to 1,700° to 2,050° C. and impregnated with molten silicon at the same temperature with subsequent cooling.

However, antifriction products made by this method have low wear resistance, particularly in hydroabrasive media, and the blank is impregnated non-uniformly across its thickness, which ultimately reduces the percentage yield of end products.

SUMMARY OF THE INVENTION

It is an object of the present invention to obviate the above disadvantages.

The principal object of the invention is to provide a method of making antifriction products featuring high strength and wear resistance when exposed to corrosive and hydroabrasive media.

Another object of the invention is to provide a method of making antifriction products, ensuring uniform impregnation of carbon blanks with molten silicon across their thickness, thereby increasing the yield of end products.

With these and other objects in view, in a method of making antifriction products, comprising heating of a carbon blank up to a temperature of 1,800° to 2,200° C. in an inert atmosphere or vacuum and impregnation thereof with molten silicon, followed by cooling, according to the invention, the carbon blank is from porous carbon, and its impregnation with molten silicon starts at a temperature of 2,100° to 2,200° C. for 3 to 5 minutes, then at 1,800° to 2,050° C. for 30 to 40 minutes.

Such a technique of impregnating a porous carbon (graphite) blank with molten silicon permits filling completely both large and small pores of the blank with liquid silicon which is then transformed to silicon carbide at a lower temperature (1,800° to 2,050° C.) during 30 to 40 minutes. As a result, the material of the product acquires a dense graphite-carbide structure with even phase distribution.

In accordance with the invention, a porous carbon blank impregnated with molten silicon and having a temperature of 1,800° to 2,050° C. is cooled down to a temperature of 900° to 800° C. at a rate of 30° to 40° C. per minute, then to 200° to 150° C. at a rate of 50° to 100° C. per minute.

In this case, the effect of supersaturation of the solid solution of carbon in silicon carbide is reached along with a lower susceptibility of the supersaturated silicon solution to the etching action of carbon, as opposed to pure silicon, and, as was established in a series of experiments, only the above-mentioned rates of cooling ensure optimum wear resistance and yield of end products.

Preferably, the porous carbon blank should have 25 to 50% of open pores 30 to 120 microns in size, which ensures uniform impregnation of the blank with molten silicon, hence, higher wear resistance and strength of products.

Using a blank with less than 25% of open pores less than 30 microns in size renders the properties of products inconsistent over the volume of the blank, which reduces the yield of end products, while more than 50% of open pores result in a lower strength of the products.

The invention will now be described in greater detail with reference to a preferred embodiment thereof.

Porous blanks used for impregnation can be calcined (700° to 1,000° C.) and graphitized (2,000° to 3,000° C.) based on various carbon fillers and binders, for example, such fillers as refinery and coal cokes, artificial and natural graphites, carbon fabrics and filaments, carbon black as well as such binders as coal tar and petroleum pitches, phenolic and other thermosetting and thermoplastic resins. Open pores in a porous carbon blank constitute 25 to 50% of the total blank volume, the pore size being 30 to 120 microns.

A carbon blank is heated to a temperature of 1,800° to 2,200° C. in an inert gas medium (argon, nitrogen, helium) or in a vacuum of, for example, $10^{-1}$ to $10^{-2}$ mm Hg, then impregnated with molten silicon at a temperature of 2,100° to 2,200° C. during the first 3 to 5 minutes and 1,800° to 2,050° C. during the next 30 to 40 minutes. Thereafter, the blank is cooled as follows: the blank impregnated with molten silicon and having a temperature of 1,800° to 2,050° C. is first cooled down to 900° to 800° C. at a rate of 30° to 40° C./min, then down to 200° to 150° C. at a rate of 50° to 100° C./min.

For a better understanding of the invention, the following examples of its practical embodiment are given by way of illustration.

EXAMPLE 1

10 carbon blanks, e.g. sealing rings, calcined to 900° C., and based on calcined coke and coal tar pitch with 25% of open pores having an average size of 40 microns were heated in an argon atmosphere to 2,200° C. and allowed to stay in a silicon melt for 5 minutes. Then, the temperature was brought down to 2,050° C., and the impregnation was continued for another 30 minutes. Finally, the impregnated blanks were cooled at a rate of 30° C./min down to 800° C. and at a rate of 60° C./min down to 150° C. The test results are summarized in the table at the end of the specification.

EXAMPLE 2

5 carbon blanks calcined to 1,000° C. were essentially thrust journals for an oil well pump, based on roasted coke, graphite and coal tar pitch. Open pores 50 microns in average size constituted 30%. The blanks were heated in a vacuum of $10^{-1}$ mm Hg up to 2,100° C. and were allowed to stay in a silicon melt for 4 minutes. Then, the temperature was lowered to 1,900° C. at which temperature the blanks were kept for 35 minutes. Thereafter, the impregnated blanks were cooled down to 850° C. at a rate of 35° C./min and further down to 200° C. at a rate of 70° C./min.

EXAMPLE 3

3 sliding bearing blanks graphitized to 2,400° C., based on calcined coke, carbon filaments and coal tar pitch and having 35% of open pores 60 microns in average size, were heated in argon up to a temperature of 2,150° C. and allowed to stay in a silicon melt for 3 minutes. Then, the temperature was brought down to 1,850° C. and maintained at that level for 30 minutes. Finally, the impregnated blanks were cooled down to 900° C. at a rate of 40° C./min and down to 150° C. at a rate of 80° C.

EXAMPLE 4

5 thrust bearing blanks calcined to 900° C., based on graphite and phenol-formaldehyde resin and having 40% of open pores 100 microns in average size, were heated to 2,100° C. in a vacuum of $10^{-2}$ mm Hg and allowed to stay in a silicon melt for 5 minutes. Then, the temperature was brought down to 1,800° C. and maintained at that level for 30 minutes. Finally, the impregnated blanks were cooled down to 800° C. at a rate of 40° C./min and down to 200° C. at a rate of 100° C./min.

EXAMPLE 5

10 sealing ring blanks graphitized to 2,600° C., based on calcined refinery coke, carbon black and petroleum pitch with the addition of wax and having 50% of open pores 120 microns in average size, were heated to 2,200° C. in argon and allowed to stay in a silicon melt for 5 minutes. Then, the temperature was lowered to 2,000° C. and maintained at that level for 30 minutes. The impregnated blanks were then cooled down to 900° C. at a rate of 30° C./min and down to 150° C. at a rate of 120° C./min.

The table that follows gives comparative data on the properties of products made by this and prior art methods.

The yield of quality end products was determined, firstly, visually with due account for cracks and uniformity of impregnation and, secondly, by measuring wear which must be within the tabulated limits.

Wear tests were carried out with a load of up to 10 kgf/sq.cm, at a sliding speed of up to 15 m/s at 870 rpm, at a temperature of +50° to +70° C., the lubricating medium being water containing up to 9.2% by weight of abrasive particles.

As can be seen from the table, the invention permits:
increasing the yield of quality end products 1.3 to 1.8 times;
improving the wear resistance of products 2 to 4 times;
improving the average physicomechanical characteristics by 20 to 50%.

| Properties of products | Comparative Characteristics of Products | | | | | |
|---|---|---|---|---|---|---|
| | Density, g/cu.cm. | Compression strength, kgf/sq.cm | Bending strength, kgf/sq.cm | Friction coefficient | Wear rate, microns/hr $10^{-3}$ | Yield of quality products, % |
| Made by the proposed method in accordance with Examples 1 to 5 | 2.3–2.9 | 3.000–7.000 | 900–1.300 | 0.03–0.05 | 4–7 | 70–100 |
| Average | 2.6 | 5.000 | 1.100 | 0.04 | 5.5 | 85 |
| Made by a prior art (prototype) method | 2.2–2.8 | 1.300–4.300 | 700–1.100 | 0.04–0.03 | 12–23 | 40–70 |
| Average | 2.5 | 2.800 | 900 | 0.06 | 18 | 55 |

What is claimed is:

1. A method of making antifriction products, comprising the steps of: heating a porous carbon blank to a temperature of from about 1,800° to about 2,200° C. in an inert atmosphere or vacuum; impregnating said blank with molten silicon in two stages, the first stage being conducted at a temperature of from about 2,100° to about 2,200° C. for from about 3 to about 5 minutes, and the second stage being conducted at a temperature from about 1,800° to about 2,050° C. from about 30 to about 40 minutes; and cooling said blank.

2. The method of claim 1, wherein said carbon blank impregnated with molten silicon and having a temperature of from about 1,800° to about 2,050° C. is cooled in two stages, first down to a temperature of from about 900° to about 800° C. at a rate of from about 30° to 40° C./min, and then down to a temperature of from about 200° to about 150° C. at a rate of from about 50° to about 100° C./min.

3. The method of claim 1, wherein the porous carbon blank has 25 to 50% of open pores 30 to 120 microns in size.

* * * * *